United States Patent
Valancius et al.

(10) Patent No.: US 11,784,933 B2
(45) Date of Patent: Oct. 10, 2023

(54) TRAFFIC SHAPING OFFLOAD ON A NETWORK INTERFACE CONTROLLER

(71) Applicant: Google LLC, Mountain View, CA (US)

(72) Inventors: Vytautas Valancius, Redwood City, CA (US); Rich Lane, Mountain View, CA (US); Bailey Forrest, Sunnyvale, CA (US); Chonggang Li, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/114,694

(22) Filed: Dec. 8, 2020

(65) Prior Publication Data

US 2022/0182328 A1   Jun. 9, 2022

(51) Int. Cl.
  *H04L 47/22* (2022.01)
  *H04L 47/20* (2022.01)
  *H04L 47/2441* (2022.01)
  *H04L 47/28* (2022.01)
  *H04L 47/30* (2022.01)

(52) U.S. Cl.
  CPC .............. *H04L 47/22* (2013.01); *H04L 47/20* (2013.01); *H04L 47/2441* (2013.01); *H04L 47/28* (2013.01); *H04L 47/30* (2013.01)

(58) Field of Classification Search
  CPC ..... H04L 47/22; H04L 47/20; H04L 47/2441; H04L 47/28; H04L 47/30
  See application file for complete search history.

(56) References Cited

U.S. PATENT DOCUMENTS

| | | |
|---|---|---|
| 6,215,769 B1 * | 4/2001 | Ghani .................... H04L 69/16 709/234 |
| 6,925,055 B1 | 8/2005 | Erimli et al. |
| 7,106,693 B1 | 9/2006 | Turner et al. |
| 7,243,177 B1 | 7/2007 | Davis et al. |
| 7,724,740 B1 | 5/2010 | Wang et al. |
| 7,818,460 B2 | 10/2010 | Kim et al. |
| 8,156,265 B2 | 4/2012 | Buick et al. |

(Continued)

OTHER PUBLICATIONS

Extended European Search Report for European Patent Application No. 21171383.9 dated Aug. 13, 2021. 10 pages.

(Continued)

*Primary Examiner* — Jung H Park
(74) *Attorney, Agent, or Firm* — Lerner David LLP

(57) ABSTRACT

Systems, methods, and apparatuses, including network interface controllers and computer-readable media, for traffic shaping offload. A network computing device can receive data packets for transmission and implement a traffic policy that includes transmitting at least some data packets without delay to their intended destination. Confirmation tokens for non-delayed packets can be queued in a time-indexed data structure and dequeued according to a traffic shaping policy. Confirmation tokens can be generated and stored independent of the time at which corresponding packets for the tokens are transmitted. Dequeued confirmation tokens can cause the network computing device to receive additional packets for transmission. The device can flag at least some packets for transmission without delay according to aspects of the disclosure, while un-flagged packets can be shaped according to a different traffic shaping policy.

20 Claims, 6 Drawing Sheets

(56) References Cited

U.S. PATENT DOCUMENTS

| | | |
|---|---|---|
| 9,014,198 B2 | 4/2015 | Breslin et al. |
| 9,148,485 B2 | 9/2015 | Mannava et al. |
| 2003/0152096 A1 | 8/2003 | Chapman |
| 2007/0019550 A1 | 1/2007 | Enomoto |
| 2008/0311885 A1 | 12/2008 | Dawson et al. |
| 2009/0204723 A1 | 8/2009 | Tonsing et al. |
| 2009/0285095 A1 | 11/2009 | Baden et al. |
| 2013/0077486 A1 | 3/2013 | Keith |
| 2013/0286835 A1 | 10/2013 | Plamondon et al. |
| 2018/0212886 A1* | 7/2018 | Contavalli ............ H04L 47/225 |

OTHER PUBLICATIONS

Office Action for European Patent Application No. 21171383.9 dated Jul. 25, 2023. 8 pages.

* cited by examiner

TRAFFIC SHAPING OFFLOAD ON A NETWORK INTERFACE CONTROLLER

BACKGROUND

In a network communicating data across one or more nodes, a variety of different techniques can be applied for managing how different packets of data are sent across the network to the various nodes. Managing the volume and transmission speed of communicated data remains a problem for a network of nodes, particularly when the various nodes are computing devices that have physical limits for transmitting data and can be quickly overwhelmed by a network if the limits are not respected.

Techniques for managing network traffic include techniques for prioritizing different packets according to different criteria, by delaying or expediting transmission to and from a node in accordance with a schedule. One such class of techniques for managing network traffic can include traffic shaping. Traffic shaping can refer to modifying the rate at which different packets—or portions of packets—of data are transmitted from a node. Under a traffic-shaping policy, packets can be managed according to different queues and algorithms for determining in what order packets leave a node.

Traffic shaping can also include rate-limiting, such as enforcing the rate at which packets leave or enter a node; and pacing, such as injecting inter-packet gaps to smooth traffic over time. Traffic shaping techniques can be used to manage network congestion at one or more network nodes, and can be implemented with respect to the physical limits—for example RAM or available processing power—of the different nodes of the network.

BRIEF SUMMARY

The present disclosure provides for a system, method, and apparatus, including non-transitory computer-readable media, for shaping traffic out of a network computing device by transmitting at least some packets without delay through a network interface controller (NIC), while queueing confirmation tokens for each packet in a time-indexed data structure. Instead of packets being stored in memory coupled to a network interface controller, confirmation tokens are enqueued and at least some packets are sent immediately to a destination node without delay. The confirmation token for a packet is generated and enqueued independent of whether or not the corresponding data packet was actually transmitted. Confirmation tokens are dequeued from the time-indexed data structure according to a traffic shaping policy, and passed to the network protocol stack of a host network device for fetching additional data packets.

Memory consumption can be reduced by storing confirmation tokens on the NIC instead of entire data packets. A NIC implemented according to aspects of this disclosure can send data packets independently of confirmation tokens to a network protocol stack, for example by sending a packet before a confirmation token is sent to the network protocol stack, or sending a confirmation token before sending a packet to a destination node. A NIC implemented in accordance with this disclosure can efficiently shape traffic without packet loss or head-of-line blocking. Head-of-line blocking can occur when a first packet is blocked, causing a second packet that is received after the first packet to be delayed. Aspects of this disclosure can be implemented in addition to other traffic shaping techniques, for example by not delaying certain flagged packets and enqueuing confirmation tokens only for the flagged packets.

In general, one innovative aspect of the subject matter described in this specification provides for a network computing device including one or more processors. The one or more processors can be configured to receive data packets for transmission to one or more network nodes of a network according to a traffic shaping policy. The data packets can include a first data packet. The one or more processors can be further configured to: generate and store a first confirmation token for the first data packet in a time-indexed data structure; transmit the first data packet to the one or more network nodes; and dequeue the first confirmation token for the first data packet, wherein dequeuing the first confirmation token causes the network computing device to receive an additional data packet for transmission.

The one or more processors can be further configured to generate and store the first confirmation token before transmitting the data packet to the one or more network nodes.

The received data packets can include a second data packet. The one or more processors can be further configured to transmit the second data packet to the one or more network nodes; and after the second data packet is transmitted, generate and store a second confirmation token for the second data packet in the time-indexed data structure.

The one or more processors can be further configured to: flag one or more data packets of the received data packets for transmission without delay to the one or more network nodes; transmit the one or more flagged data packets to the one or more network nodes; generate and store respective confirmation tokens for the one or more flagged data packets in the time-indexed data structure; and delay the transmission of an un-flagged data packet of the received data packets by storing the un-flagged data packet at a first time and transmitting the stored un-flagged data packet after the first time.

The time-indexed data structure can be a first time-indexed data structure and the traffic shaping policy can be a first traffic shaping policy. The one or more processors can be further configured to: dequeue the first confirmation token for the first data packet in accordance with the first traffic shaping policy, store the un-flagged data packet in memory coupled to the network computing device, generate and store an identifier for the un-flagged data packet in a second time-indexed data structure; and dequeue the identifier in the second time-indexed data structure in accordance with a second traffic shaping policy, wherein dequeuing the identifier causes the network computing device to transmit the un-flagged data packet in response to dequeuing the identifier in the second time-indexed data structure.

The one or more flagged data packets can be one or more flagged first data packets. The one or more processors can be further configured to: identify a second data packet whose transmission has been delayed, and flag one or more third data packets for transmission without delay, wherein the one or more third data packets are received after the second data packet.

The one or more processors can further configured to: maintain a current time, and generate a timestamp for the first confirmation token; and wherein the traffic shaping policy specifies dequeuing the first confirmation token when the timestamp meets or exceeds the current time.

The received data packets can be received from a plurality of applications running on the network computing device. The one or more processors can be further configured to dequeue the first confirmation token according to the traffic shaping policy, wherein the traffic shaping policy prioritizes transmission of data packets from a first application of the plurality of applications over data packets from a second application of the plurality of applications.

The plurality of applications running on the network computing device can include at least one application executing on a virtual machine running on the network computing device.

The one or more processors can be coupled to a network interface controller, and the one or more processors can be further configured to transmit the first data packet to the one or more network nodes using the network interface controller.

The network interface controller can be a programmable network interface controller.

Other implementations of the foregoing aspect can include a system of one or more computing devices, a computer-implemented method, an apparatus, and computer programs recorded on one or more computer-readable storage media.

BRIEF DESCRIPTION OF THE DRAWINGS

Like numbers represent like elements in the figures.

DETAILED DESCRIPTION

Figure 1:
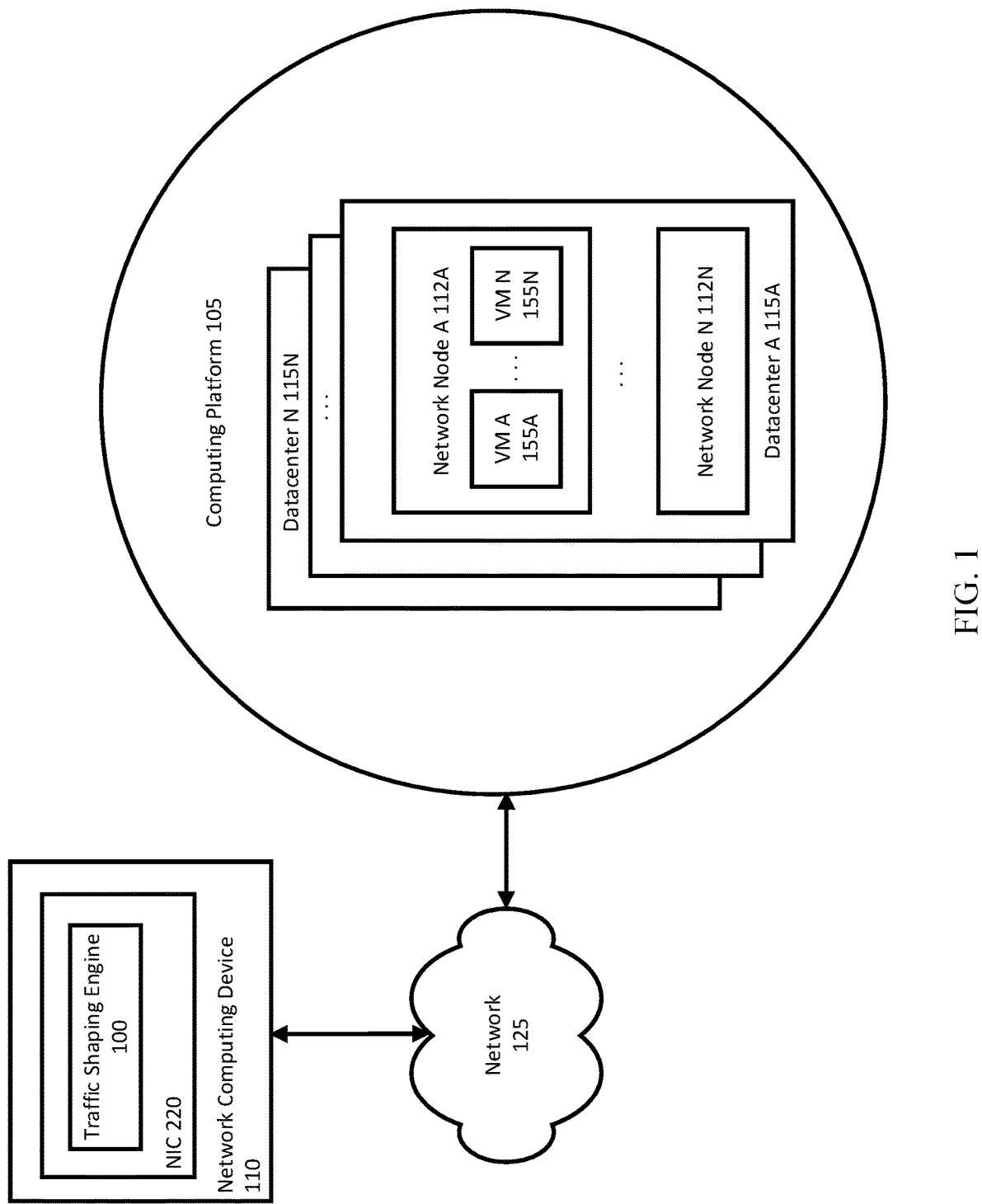
FIG. 1 is a block diagram of an example network that includes a network computing device implementing a traffic shaping engine.

FIG. 1 is a block diagram of an example network 125 that includes a network computing device 110 implementing a traffic shaping engine 100. The network computing device 110 can be coupled to a computing platform 105 through a network 125. The network computing device 110 can be any one of a variety of devices, such as a laptop, desktop computer, a mobile device like a phone or a tablet, or a device intended to be worn, such as a watch, earbuds, glasses, or a helmet. For ease of description, reference will be made to the network computing device 110 as interacting with the computing platform 105.

It should be appreciated that a typical computing platform can include a large number of connected server computing devices, many storage devices, and/or many datacenters located at one or more physical sites or locations. Although described in the context of the computing platform 105, the network computing device 110 and network nodes 112A-N can be part of any network, such as a distributed network. The computing platform 105 can include one or more datacenters 115A-N, which can be located in the same or different physical locations. Each datacenter can implement one or more network nodes. For example, the datacenter A 115A can include network nodes 112A-N.

The network 125 can be arranged according to various organizational network structures or topologies. For example, the network computing device 110 and the network nodes 112A-N can be part of a peer-to-peer network. As other examples, the network 125 can connect the network computing device 110 and the network nodes 112A-N according to a point-to-point network topology, or a hub-and-spoke network topology with one or more central—or "hub"—devices.

A network node can include one or more discrete units of physical or virtual computing resources assigned to perform a service or application. The discrete units can be specified on the computing platform as physical and/or virtual computing resources. As a physical computing resource, a node can include one or more processors and/or one or more storage devices across the one or more datacenters 115A-N of the computing platform 105. As a virtual computing resource, a node can include one or more virtual machines (VM) 155A-N, each virtual machine operating using physical processors and storage devices of the computing platform 105.

The one or more virtual machines can provide a level of abstraction between physical computing resources and a platform user of the platform, and multiple virtual machines for different platform users can operate on shared physical computing resources. From the perspective of the platform user, however, the node can appear as a dedicated physical set of hardware, such as if the platform user were executing applications or other programs directly on the hardware.

An application can be a collection of services and supporting software, such as a mail server managing incoming and outgoing email. A service can be a specialized program that performs one or more operations as part of a running application. For example, a service for a mail server can be a service for reading incoming mail according to a particular protocol, such as POP3 or IMAP. In addition to the network nodes 112A-N, the network computing device 110 can also run one or more applications, and be implemented on physical and/or virtual computing resources.

The computing platform 105 can provide an interface between the network computing device 110 and the computing platform 105. The interface can be implemented in a number of ways. For example, the computing platform 105 can implement a user interface that is displayed on a display connected to the network computing device 110.

The network computing device 110 and the network nodes 112A-N can be configured to communicate over the network 125. The network 125 itself can include various configurations and protocols including the Internet, World Wide Web, intranets, virtual private networks, wide area networks, local networks, and private networks using communication protocols proprietary to one or more companies. The network 125 can support a variety of short- and long-range connections along a variety of different bandwidths, such as 2.402 GHz to 2.480 GHz commonly associated with the Bluetooth® standard, 2.4 GHz and 5 GHz commonly associated with the Wi-Fi® communication protocol, or with a variety of communication standards, such as the LTE® standard for wireless broadband communication. The network 125 can also support wired connections between the network computing device 112, and the network nodes 112A-N, including over various types of Ethernet connection.

The network computing device 110 can implement the traffic shaping engine 100. As described in more detail herein, the traffic shaping engine 100 is configured to shape traffic transmitted to and from the network computing device 110. The traffic shaping engine 100 can be implemented as part of a network interface controller (NIC) 220. The NIC 220 is a component of the network computing device 110 for communicating data to and from the network computing device 110 and network nodes of the network 125. The NIC 220 can be implemented as a combination of hardware and software. The NIC 220 can include hardware such as integrated circuits for physically sending data through the network 125. For example, the NIC 220 can be implemented as a card that slots into a bus of a motherboard, or the NIC 220 can be integrated as part of a motherboard or other circuit board of the network computing device 110.

The NIC 220 can implement any of a variety of different features, including features for shaping packets of data to and from the network computing device 110. Traffic shaping features can be advantageously implemented on NICs of nodes as opposed to being implemented elsewhere in the network 125, such as on middle devices linking nodes of the network 125. The burden of computational processing required of traffic shaping can be distributed across the various devices in communication over the network, as opposed to relying on a predetermined number of devices connected elsewhere on the network 125.

The traffic shaping engine 100 can be implemented in any of a variety of different ways in accordance with aspects of this disclosure. For example, the traffic shaping engine 100 can be one or more circuits physically implemented on the NIC 220. Alternatively or in addition, the traffic shaping engine 100 can be programmatically implemented as part of the NIC 220. In some implementations in which the NIC 220 is programmable, the traffic shaping engine 100 can be installed as a program on the NIC 220 that is executed when the NIC 220 is in operation.

Figure 2:
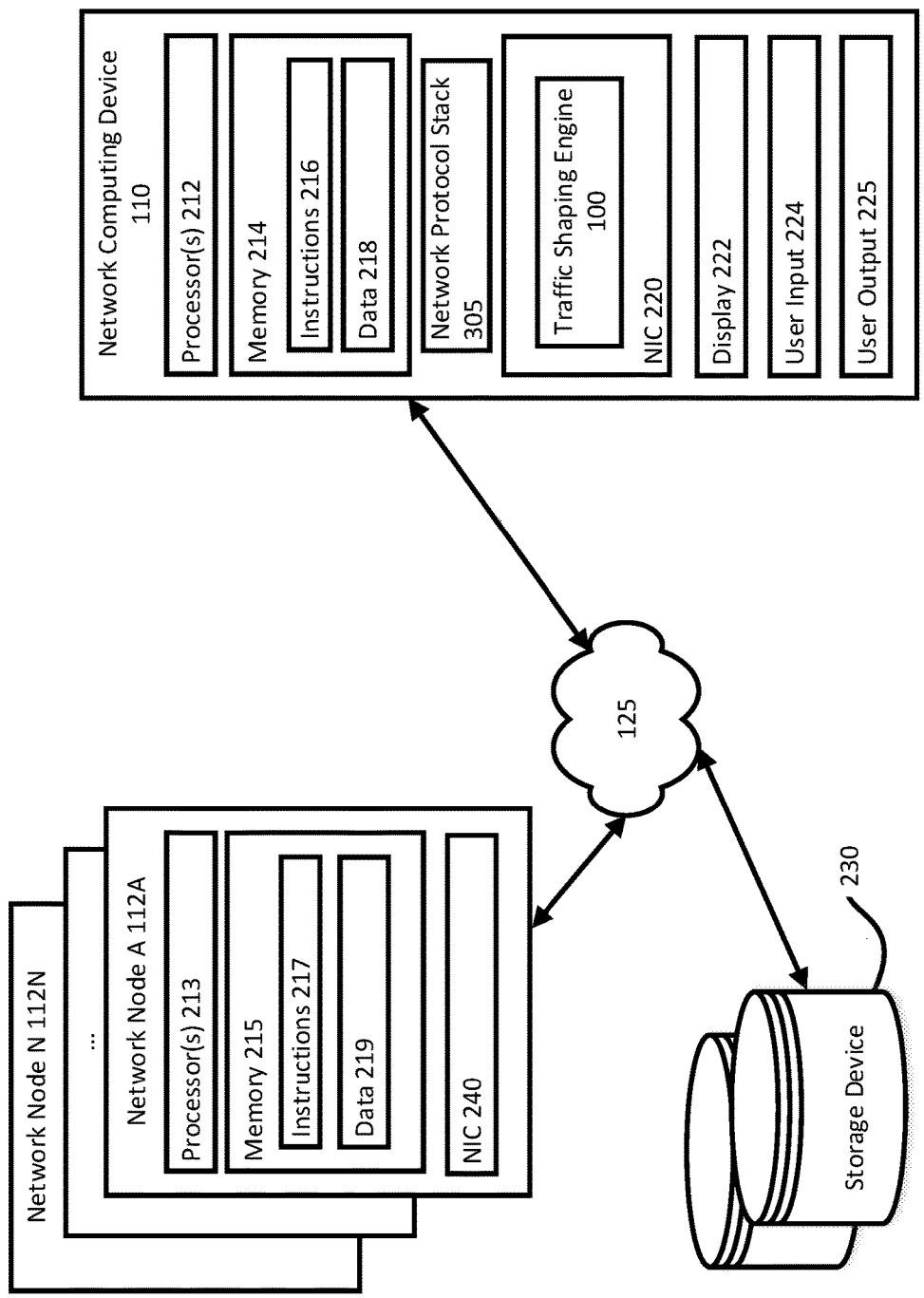
FIG. 2 is a block diagram of the network computing device and the network nodes of the network.

FIG. 2 is a block diagram of the network computing device 110 and the network nodes 112A-N of the network 125. The storage device(s) 230 can be a combination of volatile and non-volatile memory, and can be at the same or different physical locations as the network computing device 110 and the network nodes 112A-N. For example, the storage device(s) 230 can include any type of non-transitory computer readable medium capable of storing information, such as a hard-drive, solid state drive, tape drive, optical storage, memory card, ROM, RAM, DVD, CD-ROM, write-capable, and read-only memories The network computing device 110 can include one or more processors 212 and memory 214. The memory 214 can store information accessible by the processor(s) 212, including instructions 216 that can be executed by the processors 212. The memory 214 can also include data 218 that can be retrieved, manipulated or stored by the processor(s) 212. The memory 214 can be a type of non-transitory computer readable medium capable of storing information accessible by the processors 212, such as volatile and non-volatile memory. The processor(s) 212 can include one or more central processing units (CPUs), graphic processing units (GPUs), field-programmable gate arrays (FGPAs), and application-specific integrated circuits (ASICs), such as tensor processing units (TPUs).

The instructions 216 can be one or more instructions that when executed by one or more processors of the computing platform 105, causes the one or more processors to perform actions defined by the instructions. The instructions 216 can be stored in object code format for direct processing by the processors 212, or other in other formats including interpretable scripts or collections of independent source code modules that are interpreted on demand or compiled in advance.

The data 218 can be retrieved, stored or modified by the processors 212 in accordance with the instructions 216. The data 218 can be stored in computer registers, in a relational or non-relational database as a table having a plurality of different fields and records, or as JSON, YAML, proto, or XML documents. The data 218 can also be formatted in a computer-readable format such as, but not limited to, binary values, ASCII or Unicode. Moreover, the data 218 can include information sufficient to identify relevant information, such as numbers, descriptive text, proprietary codes, pointers, references to data stored in other memories, including other network locations, or information that is used by a function to calculate relevant data.

The network computing device 110 also includes a network protocol stack 305. The network protocol stack 305 can include different software and/or hardware layers for communicating across the network 125 according to a particular communication protocol. Different layers can communicate with different components of the network computing device 110. At the highest layer, the network protocol stack 305 can include a layer for communicating with user applications. At lower layers, the network protocol stack 305 is configured to process data from the higher layers to communicate the data to nodes of the network 125. As part of the network protocol stack 305, the network protocol stack 305 passes data packets to the NIC 220 to be transmitted to a destination node. Example protocols that the network protocol stack 305 can implement include HTTP, TCP, IP, and Ethernet. Other example protocols include the user datagram protocol (UDP), the reliable datagram protocol (RDP), the reliable user datagram protocol (RUDP), and the datagram congestion control protocol (DCCP).

A data packet can be a collection of data of a fixed size, for example between 20 to 512 or more bytes, which follows a specific ordering of data and/or metadata in the data packet. The exact size of a data packet can vary depending on the configuration of the network, the nodes sending or receiving the data packet, and/or the communication protocol by which the network 125 communicates the data packet. For example, a data packet configured for transmission over the transmission control protocol (TCP) can include one or more bits dedicated to a header, identification of a source and/or destination for the data packet, a checksum for verifying the contents of the data packet, and the payload or content to be transmitted. Data packets can include more or fewer fields from implementation-to-implementation.

In some implementations in which the network computing device 110 is a physical computer, the network protocol stack 305 can be part of the operating system running on the network computing device 110. In some implementations in which the network computing device 110 runs one or more virtual machines, the network protocol stack 305 can refer to a respective network protocol stack of each virtual machine, and a network protocol stack of the operating system running the one or more virtual machines. The network computing device 110 can include a hypervisor or some other mechanism for receiving packets from the one or more virtual machines and passing the packets to the network protocol stack of the operating system running the virtual machine(s).

The packets can be generated by applications or services running on the network computing device 110, directly on the operating system of the network computing device 110 and/or through one or more virtual machines running on the network computing device 110.

The network nodes 112A-N can also be configured similar to the network computing device 110. For example, the network node A 112A can include one or more processors 213, memory 215, instructions 217, data 219, and a NIC 240. In some implementations, the NIC 240 implements the traffic shaping engine 100 according to aspects of the disclosure described herein.

The network computing device 110 can also include a user output 225. The network computing device 110 can be configured to display at least a portion of received data on a display implemented as part of the user output 225. The user output 225 can also be used for displaying an interface between the network computing device 110 and the computing platform 105. The user output 225 can alternatively or additionally include one or more speakers, transducers or other audio outputs, a haptic interface or other tactile feedback that provides non-visual and non-audible information to a user of the network computing device 110.

Although FIG. 2 illustrates the processors 212, 213 and the memories 214, 215 as being within the computing devices 115, 120, components described in this specification, including the processors 212, 213 and the memories 214, 215 can include multiple processors and memories that can operate in different physical locations and not within the same computing device or node. For example, some of the instructions 216, 217 and the data 218, 219 can be stored on a removable CD-ROM or another removable storage medium, such as a read-only computer chip. Some or all of the instructions and data can be stored in a location physically remote from, yet still accessible by, the processors 212, 213. Similarly, the processors 212, 213 can include a collection of processors that can perform concurrent and/or sequential operation. The network computing device 110 and the network nodes 112A-N can each include one or more internal clocks providing timing information, which can be used for time measurement for operations and programs run by the network computing device 110 and the network nodes 112A-N.

Figure 3:
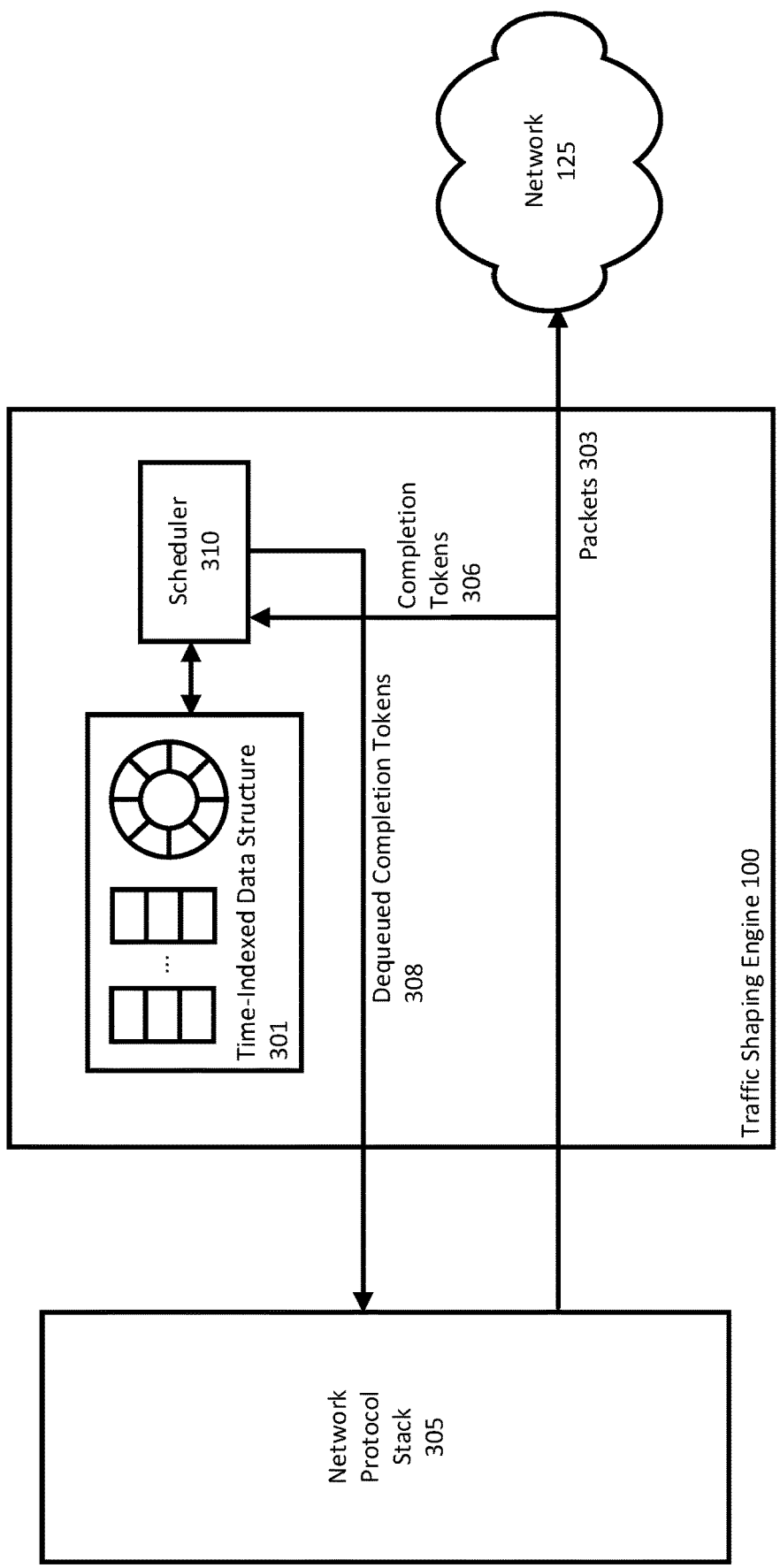
FIG. 3 is a relational block diagram illustrating the traffic shaping engine shaping outbound data packets.

FIG. 3 is a relational block diagram illustrating the traffic shaping engine 100 traffic shaping outbound data packets. The traffic shaping engine includes a time-indexed data structure 301 and a scheduler 310. The traffic shaping engine 100 receives data packets 303 and transmits the packets to one or more destination nodes on the network 125.

In some implementations, the one or more destination nodes and/or other nodes communicating data packets to the network computing device 110 can also implement the traffic shaping engine 100. Aspects of the disclosure described herein with respect to the network computing device 110 can also be implemented on at least one of the nodes in communication with the network computing device 110.

The traffic shaping engine 100 can transmit the data packets 303 without delay. The traffic shaping engine 100 processes the data packets as they are received, and generates confirmation tokens 306, one token per data packet. A confirmation token is data reported from the NIC 220 to the network protocol stack 305 to signal to the network protocol stack 305 to push another data packet to the NIC 220 for transmission.

In conventional controllers, a confirmation token can be generated when a corresponding data packet has been transmitted. However, as described according to aspects of this disclosure herein, a confirmation token can be sent before or after a corresponding packet for the confirmation token is transmitted. In other words, the generation of a confirmation token is independent of whether or not the corresponding data packet was transmitted to the network 125 by the NIC 220. The NIC 220, through the traffic shaping engine 100, can manage the rate at which additional packets are pushed by the network protocol stack 305 to the traffic shaping engine 100, by selectively dequeuing confirmation tokens stored by the time-indexed data structure 301 and the scheduler 310.

The time-indexed data structure 301 can include one or more data structures configured to store and fetch data elements based on a timestamp associated with the element. The timestamp can be relative to a standard time, such as an internal clock maintained by the network computing device 110. The timestamp can also be relative to other timestamps, for example different elements have ordinal timestamps $1^{st}$, $2^{nd}$, $3^{rd}$, etc., to indicate each element's position in time relative to one another. A first-in first-out (FIFO) queue can be an example of a time-indexed data structure, because data is stored according to the time at which the data entered the queue. Other types of time-indexed structures include a timing-wheel and a calendar queue. As another example, time-indexed data structures can include any of a variety of other types of priority queues, including first-in last-out (FILO) or last-in first-out (LIFO).

The time-indexed data structure 301 can be configured to include multiple positions to store elements up to a maximum period of time into the future. For example, a time-indexed data structure can include 50 positions, each position representing a corresponding difference in time between elements stored in adjacent positions. If each position represented, for example, 2 milliseconds, then the time-indexed data structure as a whole can represent elements up to 100 milliseconds into the future. In this example, the position at index 0 would store an element corresponding to the current time, and the position at index 49 would store an element corresponding to 100 milliseconds ahead of the current time.

Another example of a time-indexed data structure is a timing wheel. A timing wheel can be implemented as a queue, with each element in the queue corresponding to a certain offset relative to a current time. The time-indexed data structure 301 can include a timing wheel, and in some implementations, additional data structures for storing elements, such as confirmation tokens as described herein.

As an example, the additional data structures that can form part of the time-indexed data structure can include socket buffers. Socket buffers store data sent from sockets used by different applications running on the network computing device 110 for transmitting data to the network interface controller 220. A socket can be a software component for communicating data from an application to a lower layer of the network protocol stack 305. The socket can be programmatically defined, for example according to an application program interface (API), and an application running on the network computing device 110 can generate and destroy one or more sockets as appropriate for transmitting data to the network interface controller 220. The socket buffers of the time-indexed data structure 301 can store confirmation tokens corresponding to packets generated and sent to the traffic shaping engine 100 by various applications running on the network computing device 110.

The time-indexed data structure 301 is configured to enqueue the confirmation tokens 306 for the data packets 303. Confirmation tokens can be generated as the traffic shaping engine 100 receives the data packets 303, however as described herein, the enqueuing of a confirmation token is independent of whether the corresponding packet for the confirmation token has been sent or not. In other words, each of the confirmation tokens 306 may be enqueued in the time-indexed data structure 301 before or after each corresponding data packet of the data packets 303 is transmitted to the network 125.

The scheduler 310 can timestamp each of the confirmation tokens 306 according to a traffic shaping policy. The scheduler 310 can control the rate at which dequeued confirmation tokens 308 are sent to the network protocol stack 305, thereby controlling the rate at which additional packets are pushed to the NIC 220 by the network protocol stack 305. The network protocol stack 305 can be configured to transmit additional packets to the network interface controller 220 in response to receiving confirmation tokens.

In some implementations, the scheduler 310 does not explicitly timestamp each of the confirmation tokens 306, but instead manages the order in which they are enqueued sequentially. The time-indexed data structure 301 can then dequeue or pop confirmation tokens at a predetermined rate, and the order at which the time-indexed data structure 301 dequeues the confirmation tokens can be in the order the scheduler 310 scheduled the confirmation tokens, in accordance with the traffic shaping policy.

From the perspective of the network protocol stack 305, the stack 305 assumes that the corresponding packet for a received dequeued confirmation token has been sent to the network 125. In practice, however, this may or may not be true as of the time the network protocol stack 305 receives the dequeued confirmation token.

For example, the dequeued confirmation token may correspond to a packet that has not yet been transmitted by the traffic shaping engine 100. However, at least because the scheduler 310 can timestamp confirmation tokens for different future times, the scheduler 310 can cause a confirmation token to be dequeued and sent to the network protocol stack 305 such that a corresponding packet for the confirmation token has likely transmitted by the time the network protocol stack 305 pushes another packet. The timing by the scheduler 310 coupled with the traffic shaping engine 100 not delaying the packets 303 can create a dataflow in which confirmation tokens are not generated strictly on completion of the transmission of the corresponding packets, but are sent to the network protocol stack 310 such that the network protocol stack 305 is not affected by actual discrepancies between the confirmation token and the actual transmission.

Instead of delaying packets and storing packets in memory coupled to the network interface controller 220, the network interface controller 220 can instead store the confirmation tokens for the packets, and transmit the packets themselves without delay. Confirmation tokens can be much smaller relative to a packet, for example 16 bytes for a confirmation token versus 512 bytes for a corresponding packet.

Network interface controllers implemented according to aspects of this disclosure can be implemented with less memory overall, and the smaller amounts of memory that is used can be of a higher quality that is cost-prohibitive for storing entire data packets. Further, network interface controllers that are bottlenecked by memory capacity can operate faster, at least because processing cycles are not wasted waiting for memory to become available for storing additional data packets.

Aspects of this disclosure can also provide for advantages over approaches in which memory pointers are stored instead of a corresponding packet waiting transmission. This is at least because the network interface controller 220 does not require storing memory pointers for data packets which can be between 4-8 bytes for each delayed packet. Further, there is a fixed computational cost to store the memory pointer, determine that the data packet is ready for transmission, load the memory pointer, and fetch the data packet at the address in memory indicated by the pointer. The network interface controller 220, by contrast, can transmit the packet without these additional steps, all while saving on memory usage and still implementing a traffic shaping policy to prevent or mitigate network congestion or blocking.

The scheduler 310 can be configured to timestamp confirmation tokens before the elements are enqueued into the time-indexed data structure 301. The timestamp of an element stored in a time-indexed data structure can represent the time at which the element should be dequeued. The timestamp can be relative to a current time, for example 10 milliseconds in the future from the current time. Multiple elements can be timestamped with the same time. In those cases, the time-indexed data structure 301 can dequeue the same-timestamped elements according to an additional strategy, such as first-in-first-out dequeuing.

As described herein, the scheduler 310 can timestamp confirmation tokens according to a traffic shaping policy. A traffic shaping policy can refer to one or more heuristics, rules, or algorithms for the scheduler 310 to determine how incoming confirmation tokens are timestamped. Generally, the scheduler 310 timestamps higher priority confirmation tokens with a timestamp closer to the current time, and timestamps lower priority confirmation tokens with a timestamp farther from the current time.

The scheduler 310 can update timestamps for confirmation tokens in response to confirmation tokens received later-in-time. For example, the scheduler 310 may receive one or more confirmation tokens for packets originating from a higher priority application executing on the network computing device 110 as compared with currently enqueued tokens. In response, the scheduler 310 can update the timestamps of the previously enqueued confirmation tokens to prioritize the newly received confirmation tokens.

The traffic shaping policy can be one policy or a composite of different policies, each of the different policies corresponding to a different source of packets from the network protocol stack 305. For example, the network computing device 110 can execute a plurality of different applications that emit data packets, and the scheduler 310 can schedule data packets from each application in accordance with a respective traffic shaping policy. The traffic shaping policy can specify how different data packets should be prioritized. For example, the traffic shaping policy can specify that data packets from a particular source, such as a particular application running on the network computing device 110, be prioritized over data packets from other applications.

Different policies can relate to other criteria besides packet source. One example can be the type of packet being transmitted, such as different data packets for different communication protocols. The scheduler 310 can store and access different policies according to some data structure mapping an incoming confirmation token to a policy associated with the corresponding data packet for that token. One example of such a data structure can be a hash table.

The traffic shaping policy can also specify how the scheduler 310 should rate-limit and/or pace incoming traffic. Pacing can refer to injecting inter-packet gaps to smooth traffic, which can be particularly useful when the network interface controller 220 interfaces with the network 125 over a single connection. Rate-limiting can refer to the rate at which data packets are transmitted, which can be controlled by the traffic shaping engine 100 through the scheduler 310. As an example, the scheduler 310 can schedule dequeued confirmation tokens to receive additional data packets from the network protocol stack 305 to a rate at which the network interface controller 220 can sustain to continuously transmit data packets without delay. The rate can be based on the physical limitations of the hardware the traffic shaping engine 100 is implemented on, for example because the hardware can only transmit so many data packets in a second.

The traffic shaping policy can specify transmitter-side and receiver-side rate limiting. In other words, the scheduler 310 can schedule confirmation tokens to be dequeued based on data packets received from the network protocol stack 305 and/or data packets received from other nodes on the network 125. One or more nodes transmitting data packets to the network computing device 110 can also implement a traffic shaping engine similar to the traffic shaping engine 100. The transmitting node(s) and other nodes coupled to the network 125 can be configured to implement respective traffic shaping policies.

In some implementations, the scheduler 310 can also schedule confirmation tokens based on packet acknowledgments sent from one or more nodes that have received data packets transmitted by the network computing device 110. A packet acknowledgment is data sent in response to a successful receipt of a data packet from a receiving network node of the network 125.

In some implementations, the network protocol stack 305 is configured to automatically push a data packet to the traffic shaping engine 100 in response to receiving a packet acknowledgment. In some implementations, the traffic shaping engine 100 receives the packet acknowledgment and can cause the scheduler 310 to schedule confirmation tokens for dequeuing at least partially based on receipt of packet acknowledgments. For example, receipt of packet acknowledgments from a particular network node can indicate that the network node is available to receive more data. In response, the scheduler 310 can prioritize dequeuing tokens corresponding to data packets for an application in communication with the recipient network node.

The scheduler 310 can be configured to dequeue confirmation tokens in exchange for additional packets from the network protocol stack 305 so as to provide backpressure as necessary for the network interface controller 220. Backpressure can refer to the opposition of additional incoming data to a component subject to one or more conditions. For example, the dequeued confirmation tokens 308 can provide a form of backpressure between the traffic shaping engine 100 and the network protocol stack 305. This is at least because the network protocol stack 305 can be configured to emit additional packets to the traffic shaping engine 100 only in response to the dequeued confirmation tokens 308. Because the scheduler 310 determines when confirmation tokens are dequeued, the scheduler 310 can adjust backpressure between the network protocol stack 305 and the network interface controller 220 to reduce or increase the stream of incoming data packets as needed.

Figure 4:
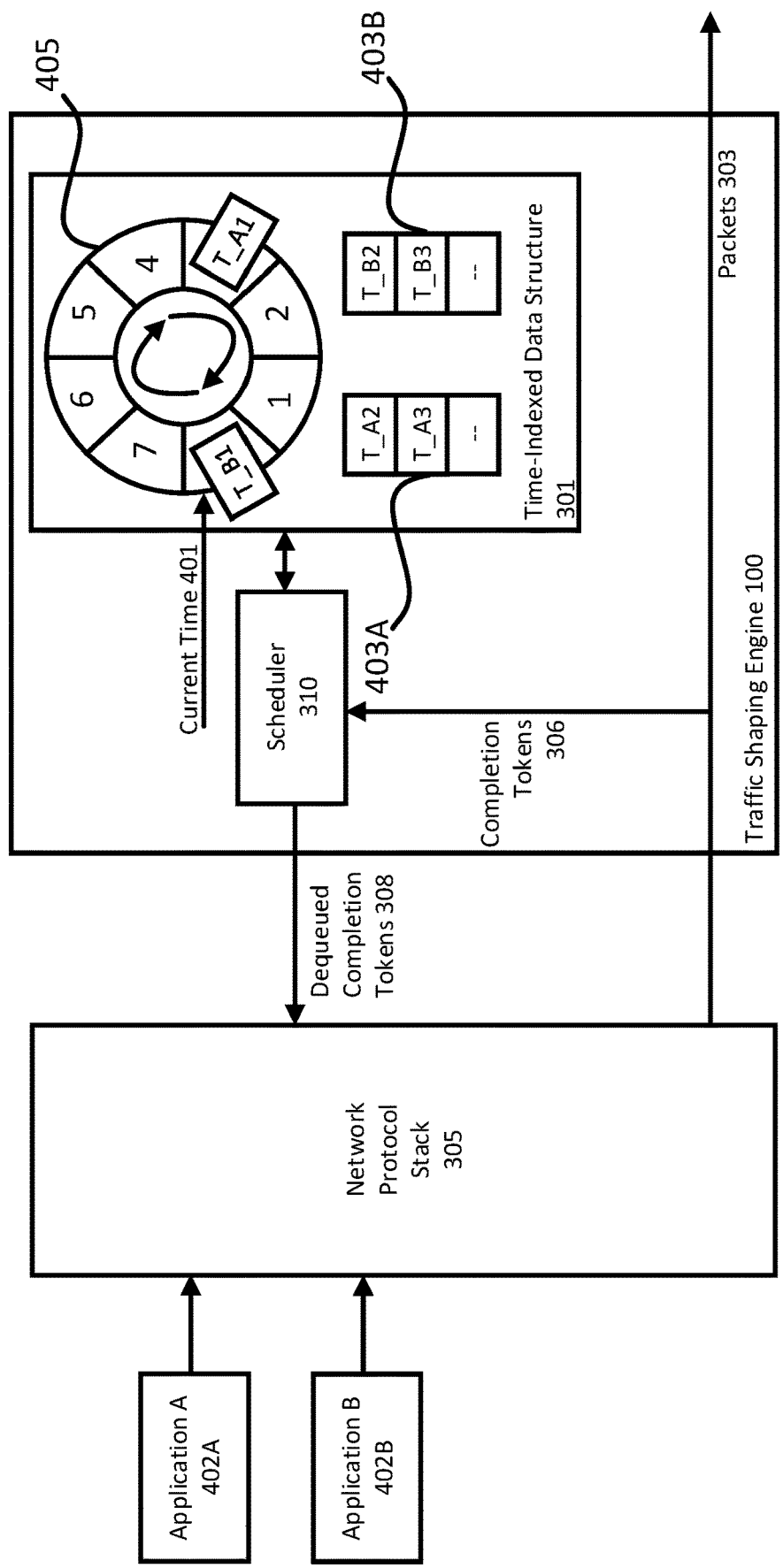
FIG. 4 is a block diagram of the time-indexed data structure for the traffic shaping engine.

FIG. 4 is a block diagram of the time-indexed data structure 301 for the traffic shaping engine 100. As described herein with reference to FIG. 3, the network protocol stack 305 can push the packets 303 to the traffic shaping engine 100. The traffic shaping engine 100 can transmit the packets 303 and can generate the confirmation tokens 306. The scheduler 310 can receive the confirmation tokens 310 and can schedule their entry into the time-indexed data structure 301.

The time-indexed data structure 301 as shown in FIG. 4 can include a socket buffer A 403A and a socket buffer B 403B. The socket buffers 403A-B can correspond to confirmation tokens corresponding data packets generated by applications 402A-B, respectively. T_A1, T_A2, and T_A3 refer to confirmation tokens for data packets A1, A2, and A3 generated by the application A 402A. Similarly, T_B1, T_B2, and T_B3 refer to confirmation tokens for data packets B1, B2, and B3 generated by the application B 402B. Consistent with aspects of this disclosure, the scheduler 310 can enqueue the confirmation tokens T_A1 through T_B3 independent of whether or not the traffic shaping engine 100 transmitted the corresponding data packets A1-B3.

The time-indexed data structure 301 can also include a timing wheel 405. The timing wheel 405 can be implemented as a circular queue, in which the timing wheel 405 corresponds to a future time period, and each position of the timing wheel 405 corresponds to an interval of time within the future time period.

For ease of description, the timing wheel 405 is described as having positions with respective indices labeled 0-7. T_B1 is shown in the position at index 0, and T_A1 is shown in the position at index 3. Also for ease of description, the timing wheel 405 is shown as rotating clockwise through time. It is understood, however, that in some implementations the timing wheel 405 can include hundreds or thousands of positions with corresponding indices.

As the timing wheel 405 moves forward in time, the scheduler 310 can check whether a position at the current time 401 has a confirmation token to dequeue. If so, the scheduler 310 can dequeue the confirmation token and send the dequeued confirmation token to the network protocol stack 305 in exchange for another data packet. The scheduler 310 can schedule confirmation tokens intended to be dequeued within the future time period specified by the timing wheel 405. The scheduler 310 can buffer confirmation tokens that are scheduled later than the future time period in one of the socket buffers 403A-B.

The scheduler 310 can be configured to poll the time-indexed data structure 301 at a constant interval to determine whether a confirmation token is scheduled to be dequeued, for example because the timestamp is the same time or older than the current time. The scheduler 310 can poll the time-indexed data structure 301 can be polled periodically with a period equal to the length of time associated with each time slot or a multiple thereof.

The traffic shaping policy implemented by the scheduler 310 can specify how confirmation tokens are dequeued from the socket buffers 403A-B. The traffic shaping policy can specify rules for balancing the dequeuing of each socket buffer fairly and/or according to some weight to prefer dequeuing by one socket buffer over another. For example, the scheduler 310 can alternate between the socket buffers 403A-B. As another example, the scheduler 310 can prioritize dequeuing confirmation tokens closer to the current time, and/or prioritize dequeuing confirmation tokens from the application A 402A over the application B 402B.

The scheduler 310 can also schedule the enqueued confirmation tokens according to a rate limit. The scheduler 310 can timestamp confirmation tokens for later times to allow for some confirmation tokens to be dequeued later relative to others, which can help to maintain the current rate at which tokens are dequeued and new packets are pushed to the network interface controller 220 and the traffic shaping engine 100.

Figure 5:
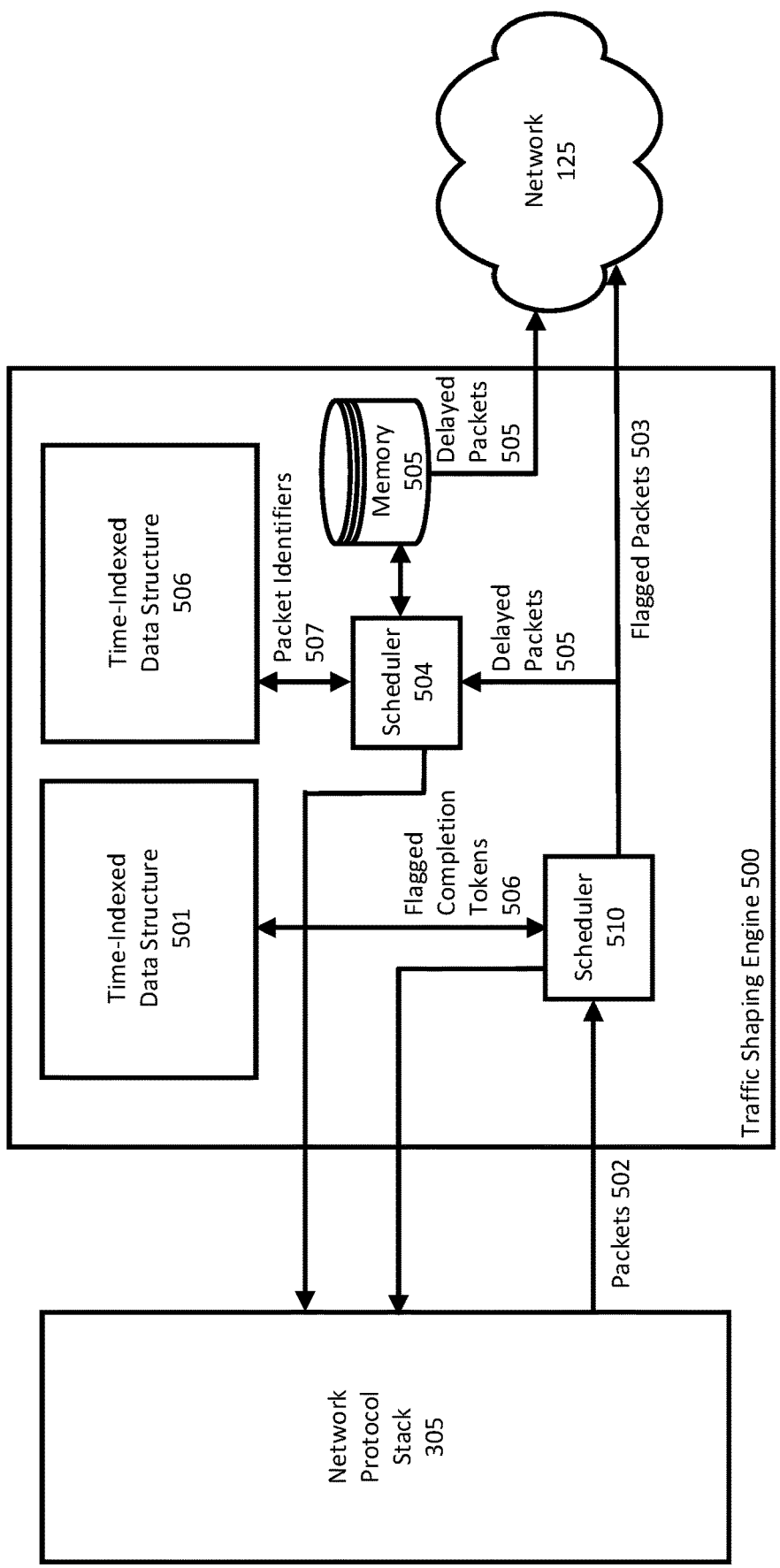
FIG. 5 is a block diagram of the traffic shaping engine implementing separate time-indexed data structures for delayed and un-delayed outbound data packets.

FIG. 5 is a block diagram of a traffic shaping engine 500 implementing separate time-indexed data structures 501, 506 for delayed and un-delayed outbound data packets. The traffic shaping engine 500 according to some aspects of this disclosure can transmit some data packets without delay according to a first traffic shaping policy, such as the traffic shaping policy described herein with reference to FIG. 3. The traffic shaping engine 500 can additionally delay some other data packets according to a second traffic shaping policy. The second traffic shaping policy can be implemented by a scheduler 504 and a time-indexed data structure 506. In some implementations, both the first and the second traffic shaping policies can be implemented by the same scheduler in communication with the time-indexed data structures 501, 506.

The traffic shaping engine 500 can receive packets 502 from the network protocol stack 305 that are intercepted by the scheduler 510. The scheduler 510 can be configured to flag some packets 503 for immediate transmission, without delay. The scheduler 510 can flag packets according to a traffic shaping policy. For example, the traffic shaping policy may specify flagging packets that are subsequent to a delayed packet in time. The scheduler 510 can query the memory 505 to determine if the incoming packets follow any data packets that are currently delayed. By flagging some packets for un-delayed transmission, the traffic shaping engine 500 can mitigate or eliminate head-of-line blocking. Head-of-line blocking can occur when packets later-in-time are held up by a packet blocked that is earlier-in-time.

One way to mitigate or eliminate head-of-line blocking is to cause data packets received by the network interface controller to schedule data packets out of order. When the transmission of a data packet is blocked, for example because the recipient network node is currently unable to receive additional data packets, the traffic shaping engine 500 can flag one or more data packets received later-in-time for un-delayed transmission. In general, the traffic shaping engine 500 can flag data packets whose transmission is unrelated to the transmission of the blocked data packet. For example, the flagged data packets can include data packets that are not in communication with the blocked receipt network node.

However data packets are flagged, the traffic shaping engine 500 can transmit the flagged packets 503 without delay, in accordance with aspects of the disclosure described herein with reference to FIGS. 3-4. Other data packets that are not flagged may pass through the traffic shaping engine 500 without delay, or may be delayed for a variety of reasons. For example, data packets may be delayed because their transmission is blocked by a recipient network node, or because the rate limit for the network interface controller implementing the traffic shaping engine 100 has been exceeded. The traffic shaping engine 500 is configured to prioritize the transmission of the flagged packets 503 before other data packets. As an example, if the traffic shaping engine 500 flags a data packet for un-delayed transmission, the network interface controller implementing the traffic shaping engine 500 can transmit the flagged data packet before any un-flagged data packet scheduled for transmission.

The scheduler 504 can schedule the transmission of delayed packets 505. The time-indexed data structure 506 can be of any type of time-indexed data structure as described herein with reference to the time-indexed data structure 301, with one difference being that the time-indexed data structure 506 is configured to enqueue packet identifiers 507 corresponding to the delayed packets 505. A packet identifier is data associated with a delayed data packet stored in memory 505 coupled to the traffic shaping engine 500. A delayed data packet can be stored in the memory 505 until the time the corresponding packet identifier for the data packet is scheduled to be dequeued from the time-indexed data structure 506.

The scheduler 504 can timestamp the packet identifiers 507 according to the second traffic shaping policy and in accordance with description in this disclosure herein for the scheduler 310 in FIG. 3. The second traffic shaping policy can be any traffic shaping policy that specifies rules, heuristics, algorithms, or other conditions for delaying the transmission data from a network interface controller. The traffic shaping engine 500 illustrates how aspects of the disclosure can be implemented to augment existing solutions to traffic shaping in a discrete manner. Rather than modify the network protocol stack or other components of a network computing device, additional logic can be added to an existing network interface controller that can improve data transmission at least because of the mitigation or elimination of head-of-line blocking in accordance with aspects of this disclosure.

In some implementations in which the network interface controller is programmable, the network interface controller can be programmed consistent with aspects of this disclosure with minimal to no changes to other components of the network computing device. As a result, traffic shaping engines such as the traffic shaping engines 100, 500 can be implemented on a large scale to hundreds or thousands of network nodes in a manner that is agnostic to the communication protocol deployed by a network and its network architecture.

Figure 6:
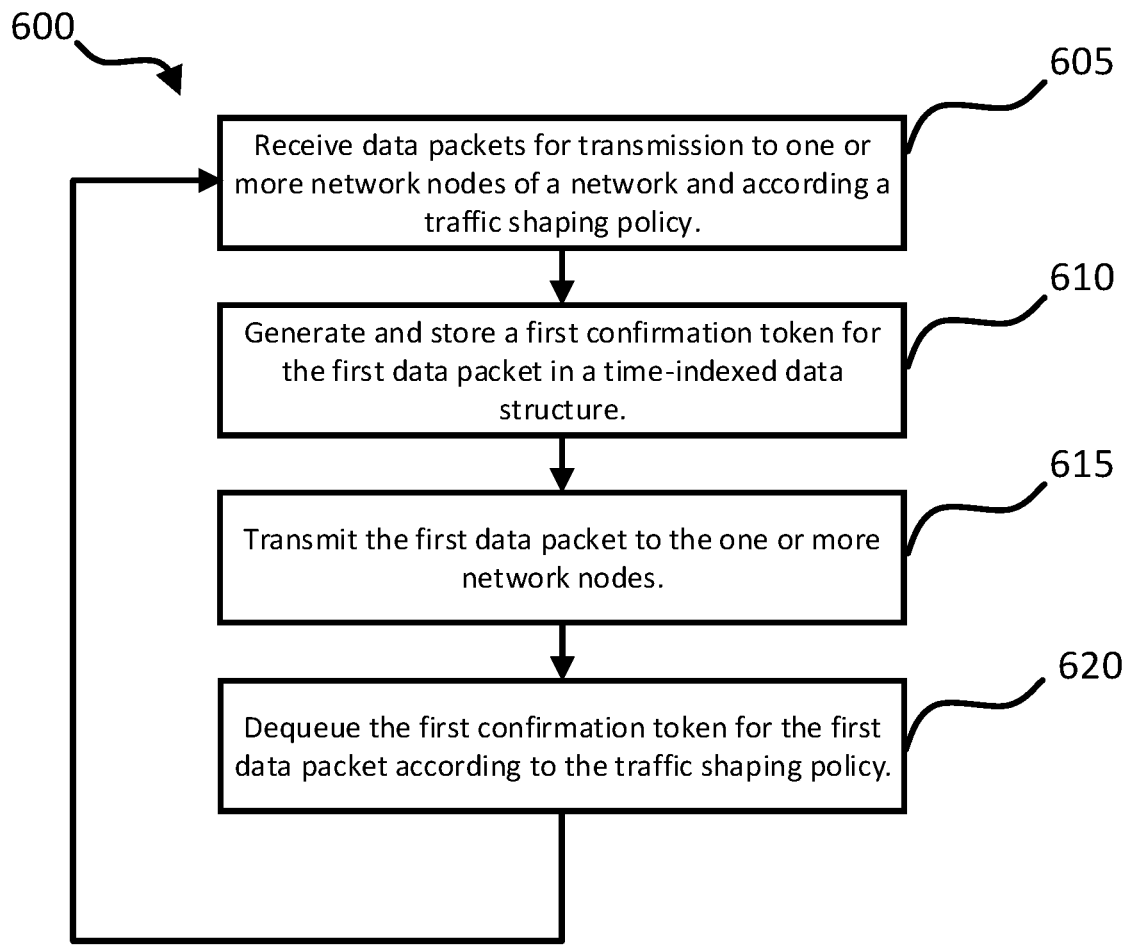
FIG. 6 is a flowchart of an example process for traffic shaping on a NIC.

FIG. 6 is a flowchart of an example process 600 for traffic shaping on a NIC. The process 600 is described as being performed by a network computing device implementing a traffic shaping engine and programmed in accordance with aspects of this disclosure. For example, the network computing device 110 implementing the traffic shaping engine 100, appropriately programmed, can perform the process 600. Steps of the process 600 can be performed in different orders, with additional steps added or some steps as shown in the process 600 removed.

The network computing device receives 605 data packets for transmission to one or more network nodes of a network and according to a traffic shaping policy. As described herein with reference to FIGS. 3-5, the network computing device can receive the data packets from a network protocol stack implemented on the network computing device. The packets can be received by a network interface controller implementing the traffic shaping engine.

The network computing device generates and stores 610 a first confirmation token for the first data packet in a time-indexed data structure. As described herein with reference to FIGS. 3-5, the traffic shaping engine can implement a time-indexed data structure and a scheduler that is configured to timestamp and insert confirmation tokens according to a timestamp. The scheduler uses the traffic shaping policy to determine what timestamp is given to each confirmation token.

The network computing device transmits 615 the first data packet to the one or more network nodes. As described herein with reference to FIGS. 3-5, the network computing device can transmit the first data packet without delay to one or more network nodes of the network. The transmission of the first data packet can be independent of the generation and enqueuing of the first confirmation token corresponding to the first data packet.

The network computing device dequeues 620 the first confirmation token for the first data packet according to the traffic shaping policy. The scheduler of the traffic shaping engine can be configured to timestamp the first confirmation token at a time relative to a current time but within a future time period, such as 100 milliseconds. As the current time increments, the scheduler can poll the time-indexed data structure to determine if there is a confirmation token to dequeue at the current time. The scheduler can dequeue the first confirmation token when the timestamp for the first confirmation token reaches the current time. The traffic shaping engine 100 can set the future time period in accordance with a rate limit defined in the traffic shaping policy. For example, to enforce a rate of 1 megabit of data per second, the future time period might extend to 12 milliseconds from the current time.

After the network computing device dequeues 620 the first confirmation token, the network computing device can repeat the process 600 and receive 605 data packets for transmission. The received data packets can be, for example, data packets received in response to dequeuing 620 the first confirmation token.

Aspects of this disclosure can provide for the following technical advantages. A network interface controller (NIC) can be configured to delay, pace, or rate packets of data while avoiding transmission delay. Rather than saving packets to memory to be shaped during transmission, a NIC can pass at least some packets without delay for transmission and limit additional packets to the NIC according to enqueued confirmation tokens. A confirmation token is generated for each data packet processed through the NIC and is generally smaller in size than a data packet, for example 8 bytes versus 512 bytes or more of a data packet.

Confirmation tokens can be enqueued and dequeued according to a traffic shaping policy, independent of the corresponding data packets that are transmitted without delay. Despite this independent processing of confirmation token and packet, a NIC implemented in accordance with aspects of this disclosure can effectively shape traffic while avoiding delay of transmission of the data packets: bottlenecking at the network computing device implementing the NIC, bursty traffic patterns, and/or head-of-line blocking caused by blocked packets earlier-in-time holding up subsequent packets.

A programmable NIC can be programmed in accordance with aspects of this disclosure without modification to the network protocol stack of a host network device. Traffic shaping can be performed locally to distribute the computational burden of traffic shaping to intermediate devices dedicated between nodes of a network. For at least this reason, aspects of this disclosure provide for an easily scalable approach to traffic shaping, even for networks with hundreds or thousands of inter-communicating nodes running a variety of different applications and/or services.

A NIC can be implemented in accordance with aspects of this disclosure to discriminate and expedite transmission of different data packets according to various traffic shaping policies. For example, some packets may be flagged by the NIC for expedited transmission. Flagged packets can be transmitted without delay and their confirmation tokens can be enqueued and dequeued according to a time-indexed data structure. For un-flagged packets, the NIC can implement any of a variety of other traffic shaping techniques, including techniques that delay transmission of some packets and store delayed packets to memory coupled to the NIC. Because the flagged packets can be transmitted without delay, a NIC implemented in accordance with aspects of this disclosure can use less memory overall than a NIC implementing conventional traffic shaping techniques, and can reduce or eliminate delays caused by head-of-line blocking.

Aspects of this disclosure can be implemented in digital circuits, computer-readable storage media, as one or more computer programs, or a combination of one or more of the foregoing. The computer-readable storage media can be non-transitory, for example as one or more instructions executable by a cloud computing platform and stored on a tangible storage device.

A computer program can be written in any type of programming language, and according to any programming paradigm, such as declarative, procedural, assembly, object-oriented, data-oriented, functional, or imperative. A computer program can be written to perform one or more different functions and to operate within a computing environment, such as on a physical device, virtual machine, or across multiple devices. A computer program can also implement functionality described in this specification as performed by a system, engine, module, or model.

In this specification the phrase "configured to" is used in different contexts related to computer systems, hardware, or part of a computer program, module, or engine. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, module, or engine, is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the implementations should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A network computing device comprising one or more processors configured to:
  receive data packets for transmission to one or more network nodes of a network according to a traffic shaping policy, wherein the data packets comprise a first data packet and a second data packet;
  transmit the first data packet to the one or more network nodes;
  store the second data packet;
  enqueue a first confirmation token for the first data packet in a time-indexed data structure at a time after transmitting the first data packet, the first confirmation token stored in association with a timestamp representing a time the first confirmation token is scheduled to be dequeued;

dequeue the first confirmation token for the first data packet based on the timestamp;
receive an additional data packet for transmission to the one or more network nodes in response to dequeuing the first confirmation token; and
transmit the second data packet to the one or more network nodes at a time after storing the second data packet.

2. The network computing device of claim 1, wherein the one or more processors are further configured to immediately transmit the first data packet to the one or more network nodes.

3. The network computing device of claim 1, wherein the one or more processors are further configured to enqueue a second confirmation token for the second data packet in the time-indexed data structure before transmitting the second data packet.

4. The network computing device of claim 1, wherein the one or more processors are further configured to flag the first data packet for immediate transmission to the one or more network nodes.

5. The network computing device of claim 1, wherein:
the time-indexed data structure comprises a first time-indexed data structure and a second time-indexed data structure, and the traffic shaping policy comprises a first traffic shaping policy and a second traffic shaping policy; and
the one or more processors are further configured to:
enqueue the first confirmation token for the first data packet in the first time-indexed data structure;
dequeue the first confirmation token for the first data packet in accordance with the first traffic shaping policy;
store the second data packet in memory coupled to the network computing device;
enqueue an identifier for the second data packet in the second time-indexed data structure; and
dequeue the identifier for the second data packet in the second time-indexed data structure in accordance with the second traffic shaping policy, wherein the second data packet is transmitted in response to dequeuing the identifier in the second time-indexed data structure.

6. The network computing device of claim 1, wherein the one or more processors are further configured to flag the additional data packet for immediate transmission.

7. The network computing device of claim 1, wherein the one or more processors are further configured to:
maintain a current time; and
generate a timestamp for the first confirmation token, wherein the traffic shaping policy specifies dequeuing the first confirmation token when the timestamp meets or exceeds the current time.

8. The network computing device of claim 1, wherein:
the received data packets are received from a plurality of applications running on the network computing device; and
the one or more processors are further configured to dequeue the first confirmation token according to the traffic shaping policy, wherein the traffic shaping policy prioritizes transmission of data packets from a first application of the plurality of applications over transmission of data packets from a second application of the plurality of applications.

9. The network computing device of claim 8, wherein the plurality of applications running on the network computing device comprise at least one application executing on a virtual machine running on the network computing device.

10. The network computing device of claim 1, wherein:
the one or more processors are coupled to a network interface controller; and
the one or more processors are further configured to transmit the first data packet to the one or more network nodes using the network interface controller.

11. The network computing device of claim 10, wherein the network interface controller is a programmable network interface controller.

12. A system comprising:
a plurality of network nodes comprising a first network node and a second network node, wherein:
the first network node is configured to receive data packets from the second network node, including a first data packet and a second data packet; and
the second network node is configured to:
transmit the first data packet;
store the second data packet;
enqueue a first confirmation token for the first data packet in a time-indexed data structure at a time after transmitting the first data packet, the first confirmation token stored in association with a timestamp representing a time the first confirmation token is scheduled to be dequeued;
dequeue the first confirmation token for the first data packet based on the timestamp;
receive an additional data packet for transmission to the first network node in response to dequeuing the first confirmation token; and
transmit the second data packet at a time after storing the second data packet.

13. The system of claim 12, wherein the second network node is further configured to immediately transmit the first data packet.

14. The system of claim 12, wherein the second network node is further configured to enqueue a second confirmation token for the second data packet in the time-indexed data structure before transmitting the second data packet.

15. The system of claim 12, wherein the second network node is further configured to flag the first data packet for immediate transmission to one or more network nodes.

16. The system of claim 12, wherein:
the time-indexed data structure comprises a first time-indexed data structure and a second time-indexed data structure, and the traffic shaping policy comprises a first traffic shaping policy and a second traffic shaping policy; and
the second network node is further configured to:
enqueue the first confirmation token for the first data packet in the first time-indexed data structure;
dequeue the first confirmation token for the first data packet in accordance with the first traffic shaping policy;
store the second data packet in memory coupled to second network node;
enqueue an identifier for the second data packet in the second time-indexed data structure; and
dequeue the identifier for the second data packet in the second time-indexed data structure in accordance with the second traffic shaping policy, wherein the second data packet is transmitted in response to dequeuing the identifier in the second time-indexed data structure.

17. The system of claim 12, wherein the second network node is further configured to flag the additional data packet for immediate transmission to one or more network nodes.

18. The system of claim 12, wherein the second network node is further configured to:
maintain a current time according to a clock; and
generate a timestamp for the first confirmation token, wherein the traffic shaping policy specifies dequeuing the first confirmation token when the timestamp meets or exceeds the current time.

19. The system of claim 12, wherein:
the received data packets are received from a plurality of applications running on the second network node; and
the second network node is further configured to dequeue the first confirmation token according to the traffic shaping policy, wherein the traffic shaping policy prioritizes transmission of data packets from a first application of the plurality of applications over transmission of data packets from a second application of the plurality of applications.

20. A method comprising:
receiving, by a network computing device, data packets for transmission to one or more network nodes of a network according to a traffic shaping policy, wherein the data packets comprise a first data packet and a second data packet;
transmitting, by the network computing device, the first data packet to the one or more network nodes;
storing, by the network computing device, the second data packet;
enqueuing, by the network computing device, a first confirmation token for the first data packet in a time-indexed data structure at a time after transmitting the first data packet, the first confirmation token stored in association with a timestamp representing a time the first confirmation token is scheduled to be dequeued;
dequeuing, by the network computing device, the first confirmation token for the first data packet based on the timestamp;
receiving, by the network computing device, an additional data packet for transmission to the one or more network nodes in response to dequeuing the first confirmation token; and
transmitting, by the network computing device, the second data packet to the one or more network nodes at a time after storing the second data packet.

* * * * *